April 23, 1968  E. OHLMER ET AL  3,379,243
DEVICE FOR THE HEAT INSULATION OF REACTOR CHANNELS
Filed March 12, 1965  3 Sheets-Sheet 3

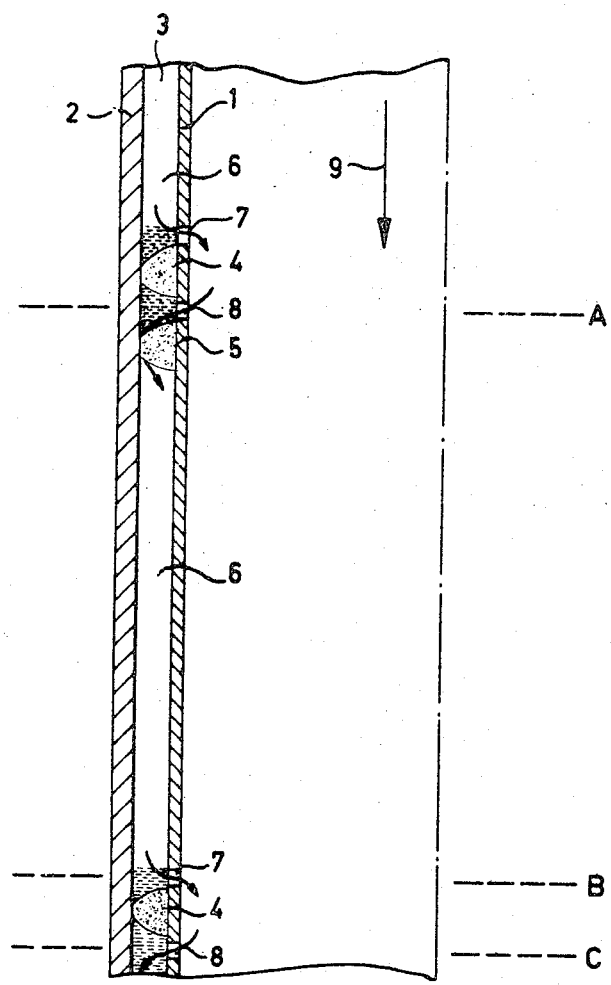

INVENTORS
Eggert OHLMER
Jacques DUFRESNE
Sergio FINZI
BY

ATTORNEYS

United States Patent Office 3,379,243
Patented Apr. 23, 1968

3,379,243
DEVICE FOR THE HEAT INSULATION
OF REACTOR CHANNELS
Eggert Ohlmer, Velate, Varese, Jacques Dufresne, Varese, and Sergio Finzi, Masnago, Varese, Italy, assignors to European Atomic Energy Community (Euratom), Brussels, Belgium
Filed Mar. 12, 1965, Ser. No. 439,399
Claims priority, application Germany, Mar. 16, 1964, E 26,618
6 Claims. (Cl. 165—135)

ABSTRACT OF THE DISCLOSURE

For the heat insulation of a double-walled nuclear reactor pressure tube channel, flow restricting elements and pressure equalizing holes are provided in the clearance between the inner fuel sheath and the outer pressure tube in such a way that the pressure equalizing holes are disposed upstream of the restricting elements and along circumferential lines, the elements being disposed in spaced relationship axially of the channel so that a separate coolant flow injected into the clearance will fill the clearance chambers formed by the spaced restricting elements with gas to thus thermally insulate the outer wall. As an alternative, the restricting elements and the holes are provided in pairs closely adjacent each other and a coolant stream is fed into the pressure tube that remains just unsaturated under the most unfavorable reactor conditions.

This invention relates to a device for the heat insulation of reactor channels. In heavy-water moderated pressure-tube reactors with liquid cooling, such as for instance, the Orgel reactor, the pressure tubes have to be heat-insulated against the hot cooling liquid flowing inside the channel, so as to keep them at the temperature of the heavy-water moderator of about 80° C. without too much heat loss.

The efficiency, and therewith the whole economy of the reactor installation depends essentially on the quality of the insulation, due to the fact that this insulation decreases the heat losses on the channels and maintains the pressure tube at a low temperature, so that it has a higher strength and can be made with a thinner wall. This possibility of making the pressure tubes with thinner walls by a more efficient pressure-tube insulation is of particular importance for the neutron economy of reactors which are operated with nuclear fuels that are scarcely enriched or not enriched at all.

The reactor nucleus in such a type of reactor consists of a large number of pressure-tube channels which extend perpendicularly through the moderator, the heavy-water bath. The channel structure may be described in general as follows:

The cluster of fuel elements are surrounded by the so-called fuel sheath through which the cooling liquid flows. The sheath again is surrounded by a second tube, the pressure tube, whereby a clearance is formed between them for the reception of the heat insulation. This clearance, also called insulating clearance, is filled with a solid, liquid or gaseous insulating material.

The outside cold pressure tube serves to absorb the pressure forces of the refrigerant flowing inside the inner fuel sheath, so that the latter is completely, or at least to a great extent, pressure relieved and may be built with a very thin wall. This, however, can only be obtained if the insulating material used in the insulating clearance is capable of transmitting these presure forces.

Therefore the insulation in the insulating clearance has to meet the following essential requirements:

It must have a good heat-insulating value and a small neutron absorption.

It must have the capacity of transmitting the pressure forces from the refrigerant stream to the pressure tube and be resistant under reactor conditions.

The present technology has so far proposed the following heat insulation for the insulating clearance of reactor channels:

(a) *Gas insulation*

The insulating clearance is filled with a gas under a predetermined pressure.

In this type of insulation the pressure drop in the refrigerant flowing along the central channel, is not transmitted to the insulating clearance, so that the forces resulting therefrom have to be absorbed by the fuel sheath. Therefore, the sheath acts, at the same time as a pressure tube and, being at a high temperature, has to be very strong, which again causes an increased neutron absorption.

(b) *Solid insulation*

Solids used for the heat insulation of the clearance as for instance, ceramic substances, generally have a higher thermal conductivity and neutron absorption than gases. Furthermore, the transmission of pressure from the sheath and the pressure tube is problematic and technologically not yet solved.

(c) *Liquid insulation*

The same liquid that serves as refrigerant flows through the insulating clearance. By means of suitable insertions in the insulating clearance, the liquid flowing in the clearance is slowed down in such a way that the pressure corresponds by degrees with the pressure drop in the channel.

The sheath is thus quite suitably relieved. A disadvantage is, however, the higher heat and neutron losses of this type of insulation.

(d) *Insulation by means of refrigerant-impregnated quartz tissue*

The insulation clearance is filled to a large extent with quartz tissue. The fuel sheath has several pressure-equalizing boreholes, so that liquid from the refrigerant stream (generally an organic refrigerant) penetrates and slowly flows through the tissue layers.

Type (d) is an improvement of type (c), but still has a relatively high heat and neutron losses.

The device and method according to the invention are characterized by the following features:

In the insulation clearance between the pressure tube and the sheath are mounted flow-restricting elements of a known kind disposed at predetermined distances from one another and pressure equalizing holes are provided, close to the flow-restricting elements, through the fuel sheath and distributed on the sheath circumference.

The restricting elements with the corresponding pressure-equalizing holes may also be arranged in pairs in the insulating clearance, whereby the restricting elements forming one pair are preferably arranged close together.

With the restricting elements, more or less regularly distributed over the channel length in the insulating clearance, a refrigerant solution, preferably saturated with gas, is made to flow in the clearance under the pressure and temperature conditions at the channel inlet whereby the cooling stream in the sheath is essentially free from gas. When arranging the restricting elements and the corresponding pressure-equalizing holes in pairs, the total circulating refrigerant is preferably dissolved with gas in such a quantity that under the potentially most unfavourable operating conditions it is just unsaturated.

The gas to be dissolved in the refrigerant is, in accordance with the method according to the invention, nitrogen, carbon dioxide, a noble gas, or a mixture of these gases.

The invention will now be described with reference to the embodiments shown in the appended drawing, wherein:

FIG. 1b is a vertical cross-sectional half-view, on a larger scale, of another embodiment of a channel made according to the invention;

Figure 1A:
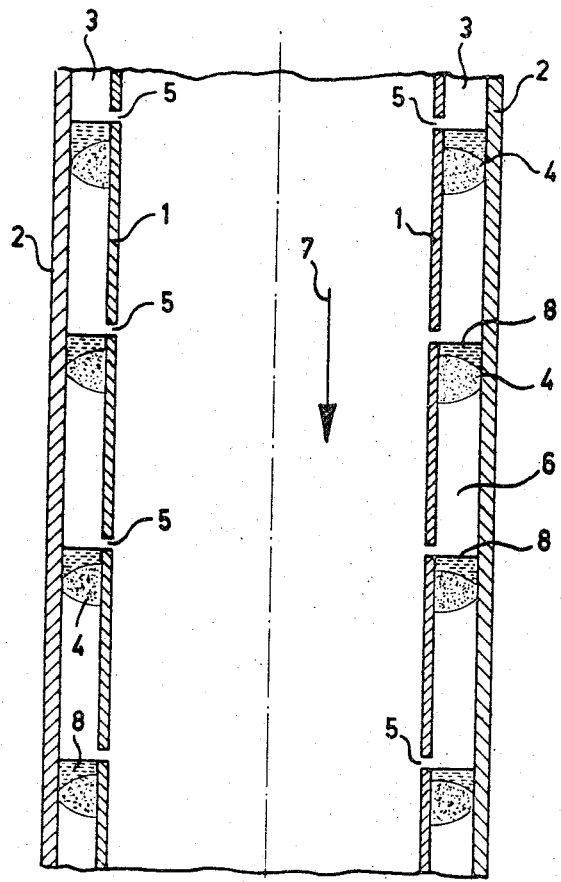
FIG. 1a is a vertical cross-sectional view of part of a channel made according to this invention.

In FIG. 1a, a series of flow-restricting elements of rings 4 are shown mounted on an inner fuel sheath 1 in the clearance 3 created by sheath 1 and a pressure tube 2. Immediately above each element 4 there are provided pressure-equalizing holes 5 through sheath 1, distributed over the tube circumference so that the pressure in the clearance chambers 6, between each two elements 4, is the same as that in the fuel cooling stream 7 at the level of the pressure-equalizing holes. Thus, fuel sheath 1 is suitably pressure-relieved.

Elements 4 together with the pressure-equalizing holes 5 cause the same pressure drop to take place in the successive clearance chambers 6 as take place along fuel cooling stream 7.

Contrary to the case of liquid-insulation, the insulating clearance is filled with a refrigerant solution 8 saturated with a gas under the temperature and pressure conditions prevailing at the channel inlet.

The operation of the heat-insulation system according to the invention will be clear from the following description of the working process.

As soon as the saturated solution passes the first flow-restricting element, it is exposed to a sudden pressure drop. The consequence of this pressure drop is that a certain amount of the gas escapes from the solution, until the equilibrium of the solution has been re-established. That is to say, when passing the next restricting element another portion of the gas escapes from the solution due to the new pressure drop, and so on through all the successive chambers of the insulating clearance. The flow in the insulating clearance is small enough that the gas bubbles set free are not carried away, so that they collect in the chambers. If, at the start, the clearance was filled with refrigerant, the gas set free from the flow will gradually remove the liquid from the chambers, until the level of the equalizing holes in each chamber is reached. The gas being set free further escapes now through these holes in the form of small bubbles into the fuel cooling stream of the channel, where they are absorbed. The refrigerant solution which goes on trickling through the gas-filled clearance, collects underneath the equalizing hole on the restricting element and is pushed through by the pressure drop into the following chamber. The clearance is therefore filled with gas to over 90% and is travelled by the refrigerant solution. New gas is constantly supplied to the chambers through the flow of the solution.

In a further example of the device and method, which is not intended to limit the extent of the invention, the whole circulating refrigerant is enriched with gas. Thus, the gas contents has to remain under the lowest degree of saturation which the refrigerant in the channel might have, so that no gas can be set free anywhere in the main flow within the fuel sheath. Thus, the cooling liquid must have an increasing solubility constant for gas, as this is the case for instance with an organic refrigerant.

The device according to the invention may be made as illustrated in FIG. 1b:

Between fuel sheath 1 and the pressure tube 2 is formed the circular insulating clearance 3, which is subdivided into single chambers 6 by fuel-restricting elements 4 and 5 arranged in pairs.

The sheath 1 has immediately above each restricting element several pressure-equalizing holes 7 and 8 distributed over the circumference. Through these openings, the cooling liquid from the fuel cooling stream 9 can penetrate into the insulating clearance 3 and flow back from the insulating clearance into the fuel cooling stream. FIG. 1 shows a double-wall section, wherein heavy water (operating temperature about 90° C.) lies on the pressure-tube outer wall while an organic refrigerant (operating temperature about 300° C.) lies on the sheath outer wall.

During operation, there is a substantial pressure drop in the fuel cooling stream as it flows in the fuel sheath. This means that at the level A of the channel in FIG. 1b there is a higher pressure than at the level B. The cooling liquid will therefore penetrate from the fuel cooling stream through the holes at the level A into the insulating clearance 3 and—since the restricting element 5 has a certain permeability—infiltrate into the clearance chamber 6 lying underneath, which has the lower pressure of level B. The infiltrating liquid can flow back again through the holes at level B into the fuel cooling stream. Between level B and level C there is practically no pressure difference, because they are very close together. The restricting element 4 therefore only serves to separate the liquid collecting in the flowing direction before the pair of restricting elements from the liquid penetrating between two elements forming a pair. Thus, it is insured that each single chamber 6 in the insulating clearance is supplied with fresh organic coolant from the fuel cooling stream. The cooling liquid in the fuel cooling stream is at a high temperature, namely about 300° C. When penetrating into the insulating clearance it is led by the stopping element to the wall of the pressure tube, which only has a temperature of about 90° C. The liquid cools as it trickles down on this surface. As the liquid temperature thus decreases below the saturation temperature of the dissolved gas, a certain amount of gas is set free, which collects in the chambers and, as soon as they are filled with gas, escapes through the holes 7 in the form of small gas bubbles into the fuel cooling stream, where it is absorbed again. The effect obtained thereby is that the insulating chambers are filled to a predominant portion thereof with gas, whereby an excellent heat insulation from the stream in the sheath is obtained. Thus, the chambers are constantly passed by a small stream of liquid, branched off the main stream and reconducted thereto, which continuously provides for fresh gas supplies to the insulating chambers.

Figure 2:
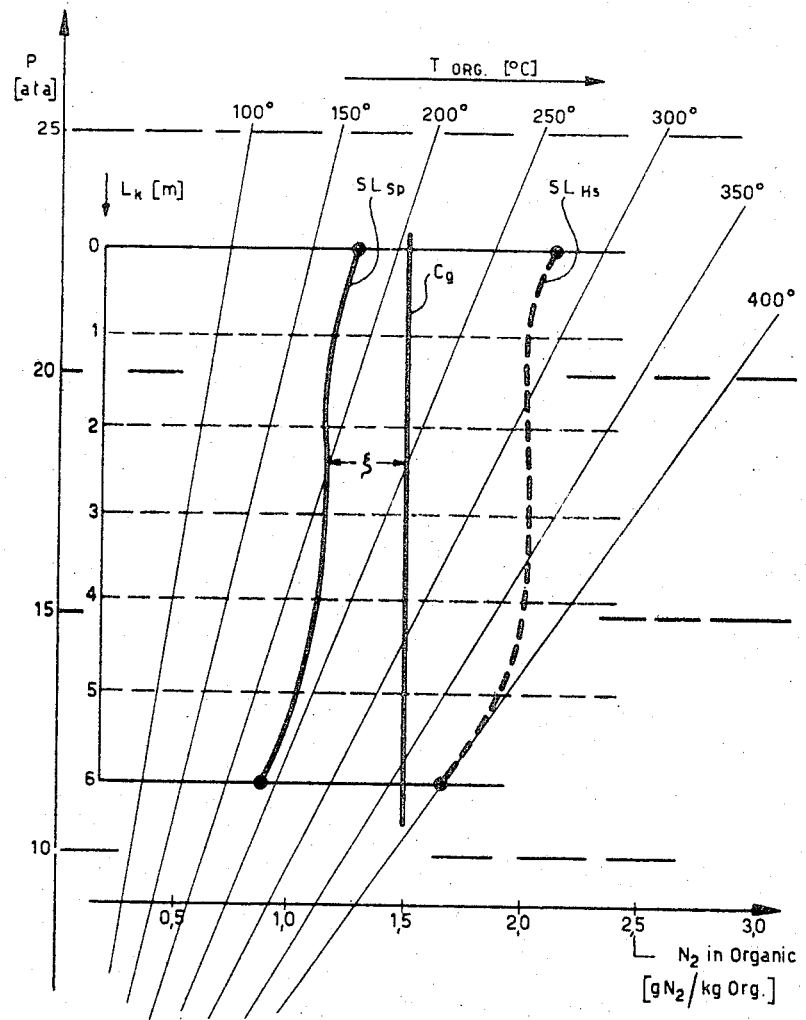
FIG. 2 is a graph of the pressure, temperature and gas-saturating conditions in an Orgel channel.
Figure 2:
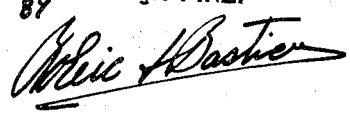

The pressure, temperature, and gas-saturating conditions over the whole channel length are illustrated in the graph of FIG. 2 and correspond with the conditions of an Orgel channel.

The main ordinate shows the pressure while the secondary ordinate shows the length of the channel.

The main abscissa indicates the solubility of nitrogen in organic coolant while the secondary abscissa gives the temperature of the organic coolant in ° C., indicated by $T_{ORG}$. $L_k$ is the channel length in meters. $SL_{Sp}$ and $SL_{Hs}$ are the saturation lines of the insulating stream and of the main stream, respectively. The gas enrichment $C_g$ proposed for the cooling liquid lies at each point of the channel length $L_k$ lower than the saturation line of the main stream. On the other hand, however, it lies at each point above the saturation line $SL_{Sp}$ of the insulating stream. The parallel distance on the abscissa between the two lines $SL_{Sp}$ and $C_g$, which is indicated by $\xi$, shows for each point over the channel length $L_k$ the amount of gas which, theoretically, would be set free with the penetrating and cooling of liquid from the main stream in the insulating clearance.

In this second embodiment of the device and method according to the invention, as compared with the first embodiment, the insulating clearance is not fed with a special liquid stream flowing separately from the main stream through the clearance chambers but each single clearance chamber is fed directly from the main stream. On the whole, the insulating system according to the second form of execution of the invention is less subject to disturbances than that according to the first one. Since, further, as may be seen from FIG. 2, the saturation line $SL_{Sp}$ of the clearance stream is practically vertical in the range of the middle of the channel length $L_k$, with the device and method according to the first form of execution practically no gas is eliminated from the clearance stream in this range. This disadvantage of the first embodiment is eliminated as well with the device and method according to the second embodiment.

The advantages of the device and the method according to the invention may be summarized as follows:

The proposed solution combines the advantages of the gas insulation with the advantages of a pressure drop in the insulating clearance which is automatically regulated by the pressure drop of the refrigerant stream, and adjusted to the first one. The heat losses due to this insulating system are very small and are only about a third of the heat losses due to the conventional liquid insulation, and they are only slightly higher than the losses due to the conventional gas insulation.

Another advantage lies in the very small neutron absorption, the clearance volume being filled to about 90% with gas.

The fuel sheath is advantageously pressure-relieved, in small steps, from the pressure forces of the channel stream, so that it can be made with a thin wall, and thus favourably with regard to neutron economy.

Through this solution the advantages of the gas insulation are combined with those of the liquid insulation, without their specific disadvantages.

We claim:

1. In a double-walled nuclear reactor cooling channel, particularly for organic liquid cooled nuclear reactors having an inner fuel sheath and an outer pressure tube, the new combination for the heat insulation of said channel, characterized in:

the provision of flow-restricting elements mounted in the clearance between said inner sheath and said outer tube at spaced predetermined axial locations in said clearance to define successive clearance chambers, and the further provision, immediately upstream of said flow restricting elements, of pressure equalizing holes through said inner tube, said holes distributed along circumferential lines thereof.

2. A combination as claimed in claim 1 wherein said flow-restricting elements are provided in pairs of closely spaced elements with pressure-equalizing holes provided immediately above each pair and therebetween.

3. A combination as claimed in claim 1 including a cooling liquid flowing in said fuel sheath along a predetermined direction and a further separate cooling liquid to flow in said clearance; the said fuel sheath liquid being essentially free of gas and the said clearance liquid being saturated with gas under the pressure and temperature conditions prevailing at the clearance inlet.

4. A combination as claimed in claim 3 wherein said gas is chosen from the group consisting of nitrogen, carbon dioxide, a noble gas and a mixture thereof.

5. A combination as claimed in claim 2 including a cooling liquid flowing in said fuel sheath and in said clearance and a gas dissolved in said liquid in a quantity such that the said liquid remains unsaturated therewith in the operating conditions of the channel.

6. A channel as claimed in claim 5 wherein said gas is chosen from the group consisting of nitrogen, carbon dioxide, a noble gas and a mixture thereof.

References Cited

FOREIGN PATENTS 990,762  4/1965  Great Britain.

OTHER REFERENCES

Japanese Patent Publication No. 38/M270 dated Aug. 7, 1963 which is same as above British patent. Copy of Japanese publication in Library.

ROBERT A. O'LEARY, *Primary Examiner.*

CHARLES SUKALO, MEYER PERLIN, *Examiners.*